(12) United States Patent
Hibbard et al.

(10) Patent No.: US 9,799,030 B2
(45) Date of Patent: *Oct. 24, 2017

(54) METHODS AND SYSTEMS FOR VERIFYING CUSTOMER SUPPLIED FINANCIAL ACCOUNT INFORMATION USING DEBIT AND CREDIT TRANSACTIONS

(71) Applicant: HSBC TECHNOLOGY & SERVICES (USA) INC., Mettawa, IL (US)

(72) Inventors: Mark Hibbard, Chatham, NJ (US); Stuart Bain, Jersey City, NJ (US)

(73) Assignee: HSBC TECHNOLOGY & SERVICES (USA) INC., Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,155

(22) Filed: May 28, 2013

(65) Prior Publication Data

US 2013/0268441 A1 Oct. 10, 2013

Related U.S. Application Data

(63) Continuation of application No. 13/209,860, filed on Aug. 15, 2011, now Pat. No. 8,452,709, which is a (Continued)

(51) Int. Cl.
*G06Q 40/00* (2012.01)
*G06Q 20/38* (2012.01)
(Continued)

(52) U.S. Cl.
CPC .......... *G06Q 20/382* (2013.01); *G06F 21/53* (2013.01); *G06Q 20/04* (2013.01); *G06Q 20/10* (2013.01);
(Continued)

(58) Field of Classification Search
CPC ...... G06C 20/40; G06C 20/10; G06C 20/385; G06C 20/401
(Continued)

(56) References Cited

U.S. PATENT DOCUMENTS

| 7,427,017 | B2 * | 9/2008 | Morrison | G06Q 20/40 235/375 |
| 7,430,537 | B2 * | 9/2008 | Templeton | G06Q 10/0635 705/26.35 |

(Continued)

*Primary Examiner* — Scott S Trotter
(74) *Attorney, Agent, or Firm* — Manatt, Phelps & Phillips, LLP

(57) ABSTRACT

Embodiment of the invention describe methods and systems for verifying customer supplied financial account information verification using debit and credit transactions. These methods include electronically transmitting an electronic debit and credit transaction to the customer financial account, based on the customer supplied financial account information. The method also includes electronically transmitting a first statement descriptor, as part of at least one of the electronic debit transaction and the electronic credit transaction, that includes a first verification code. The method also includes electronically receiving, from the customer, a second verification code, and comparing, by the computer system, the transmitted first verification code with the received second verification code with respect to each other. The method also includes verifying, by the computer system, the customer supplied financial account information based on the comparison of the verification codes.

35 Claims, 10 Drawing Sheets

Related U.S. Application Data continuation of application No. 12/790,399, filed on May 28, 2010, now Pat. No. 8,001,050, which is a continuation of application No. 12/487,947, filed on Jun. 19, 2009, now Pat. No. 7,734,542.

(60) Provisional application No. 61/075,109, filed on Jun. 24, 2008.

(51) Int. Cl.
| | | |
|---|---|---|
| *G06F 21/53* | (2013.01) | |
| *G06Q 20/04* | (2012.01) | |
| *G06Q 20/10* | (2012.01) | |
| *G06Q 20/40* | (2012.01) | |
| *G06Q 40/02* | (2012.01) | |
| *H04L 29/06* | (2006.01) | |

(52) U.S. Cl.
CPC ......... *G06Q 20/102* (2013.01); *G06Q 20/108* (2013.01); *G06Q 20/40* (2013.01); *G06Q 20/401* (2013.01); *G06Q 20/403* (2013.01); *G06Q 40/00* (2013.01); *G06Q 40/02* (2013.01); *H04L 63/166* (2013.01)

(58) Field of Classification Search
USPC .......................................................... 705/44
See application file for complete search history.

(56) References Cited

U.S. PATENT DOCUMENTS

| | | | | |
|---|---|---|---|---|
| 7,734,542 | B2* | 6/2010 | Bain | G06F 21/53 705/39 |
| 8,001,050 | B2* | 8/2011 | Bain | G06F 21/53 705/35 |
| 2002/0133459 | A1* | 9/2002 | Polk | G06Q 10/10 705/40 |
| 2004/0088258 | A1* | 5/2004 | McCoy | G06Q 20/04 705/43 |
| 2005/0187843 | A1* | 8/2005 | Lapsley | G01F 19/005 705/35 |
| 2006/0161435 | A1* | 7/2006 | Atef | G06F 21/31 704/246 |
| 2007/0198432 | A1* | 8/2007 | Pitroda | G06Q 20/02 705/64 |
| 2007/0255653 | A1* | 11/2007 | Tumminaro | G06Q 20/10 705/39 |
| 2007/0260536 | A1* | 11/2007 | Stone | G06Q 20/042 705/39 |

* cited by examiner

METHODS AND SYSTEMS FOR VERIFYING CUSTOMER SUPPLIED FINANCIAL ACCOUNT INFORMATION USING DEBIT AND CREDIT TRANSACTIONS

CROSS-REFERENCE TO RELATED APPLICATIONS

This application is a continuation of U.S. patent application Ser. No. 13/209,860, filed Aug. 15, 2011, now U.S. Pat. No. 8,452,709, which application is a continuation of U.S. patent application Ser. No. 12/790,399, filed May 28, 2010, now U.S. Pat. No. 8,001,050, which is a continuation of U.S. patent application Ser. No. 12/487,947, filed Jun. 19, 2009, now U.S. Pat. No. 7,734,542, which claims the benefit under 35 U.S.C. 119(e) of U.S. Provisional Patent Application 61/075,109, filed Jun. 24, 2008, all of which are hereby incorporated by reference herein in their entirety.

BACKGROUND OF THE INVENTION

Field of the Invention

The invention relates generally to verifying customer provided financial account information. More specifically, the invention relates to verifying the customer provided financial account information to allow the customer to perform a financial transaction, either immediately or in the future, by requiring the customer to confirm receipt of information, including, for example, verification codes using predetermined actions and/or processes.

Description of Related Art

For certain applications, such as online banking applications or automatic bill payment, the customer provides financial account information for performing a financial transaction. This financial account information is provided by a customer before using the application, for example, during registration with an automatic bill payment service. Confirming a customer's financial account information helps to ensure that the customer is the owner of the financial account, reducing the chance of a problem when transferring money to or from the account.

One method of verifying customer provided financial account information is to post two ACH credit transactions to a customer's account. Both credit transactions include identifying the sender of the credit transactions. Each transaction also credits the customer's account for a random amount of funds (e.g. 13 cents and 45 cents). The customer verifies their account by accessing their bank account statement for the financial account, and providing the exact amount of each credit transaction to an account verification system.

We have determined that disadvantages of this method include, that the combination of credit transactions only provides a certain number of unique combinations. If the amount of a credit transaction is limited to amounts between 0.01 and 0.99, two credit transactions results in only about 10000 unique combinations. Another disadvantage is the cost of the credit transactions to the sending party. We have determined that what is needed is a more secure and cost effective way of verifying customer provided financial account information.

SUMMARY OF THE INVENTION

Embodiments of the invention describe methods and systems for verifying customer supplied financial account information using debit and credit transactions. One method includes a computer implemented method for verifying customer supplied financial account information for a customer financial account. The method also includes electronically transmitting an electronic debit transaction to the customer financial account, based on the customer supplied financial account information. The method also includes electronically transmitting an electronic credit transaction to the customer financial account, based on the customer supplied financial account information. The method also includes electronically transmitting a first statement descriptor, as part of at least one of the electronic debit transaction and the electronic credit transaction, comprising a first verification code. The method also includes electronically receiving, from the customer, a second verification code, and comparing, by the computer system, the transmitted first verification code with the received second verification code with respect to each other. The method also includes verifying, by the computer system, the customer supplied financial account information based on the comparison of the verification codes.

In some embodiments of the invention, the electronic debit transaction and the electronic credit transaction are ACH transactions. In other embodiments of the invention, the electronic debit transaction is for a first amount, and the electronic credit transaction is for a second amount that offsets the first amount. In other embodiments of the invention, the method further includes receiving a failed transaction notification in response to the credit transaction, the notification including corrected financial account information, and sending a second debit transaction, with a new verification code, using the corrected financial information. Embodiments of the invention also include checking, in real-time, a routing number of the customer supplied financial account information using a database to ensure it is a valid routing number, and checking, in real-time, an account number of the customer supplied financial account information using a database of excluded account numbers.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

DETAILED DESCRIPTION OF EMBODIMENTS OF THE INVENTION

Figure 1:
FIG. 1 shows debit and credit transactions with a verification code in a statement descriptor of the credit transaction.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Embodiments of the invention provide methods and systems for verifying customer provided financial account information. More specifically, using the customer provided financial account information, a credit and/or debit transaction is generated. One or more of the transactions can have added to them a verification code that is embedded within a statement descriptor of the transaction. This verification code is an additional piece of information included in a credit or debit transaction. The customer verifies their account information by providing the one or more verification codes to an account verification system, for example, through a web interface. The verification codes can be any type of code capable of being added to the statement descriptor, for example, an alphanumeric code. The code can appear anywhere in the statement descriptor and take up a portion, or all, of the statement descriptor. The verification codes can be randomly generated or selected from one or more pre-generated codes. The verification codes can also be unique and customer specific. In this way each customer verifies their account with a verification code that is different than that used to verify any other account.

For embodiments using both a credit and debit transaction, the transaction can be generated and sent at the same time (e.g. in a single overnight batch), or at different times (e.g. such that they are likely to appear on different statements). Additionally, the debit and credit transactions can be for offsetting amounts, such that the transactions do not cost the verifier any funds. Alternatively, the debit transaction can be for any amount equal to or less than the credit transaction. In some embodiments, the debit transaction could be a greater amount than the credit transaction.

The credit and/or debit transactions can be ACH transactions, for example, when confirming customer provided financial information for a checking account. The provided account information from a customer (user) can be an ABA routing number, and an account number. The ACH transactions can be included in a single batch of ACH transactions, or they can be submitted alone, or in separate batches (either at the same or different times). The generated transactions can also be encrypted at one or more points along the generation, submission, and execution stages. For example, a batch file of ACH transactions could be stored on an encrypted file on disk, and then transmitted to the NACHA processing network over the Internet (or any other electronic communication network) using an encrypted transmission protocol.

In other embodiments of the invention, for example, when confirming a credit card account, the transactions can be credit card transactions. Similarly, for other types of accounts, the appropriate type of transaction can be used along with a verification code in the statement descriptor (or equivalent) field.

In some embodiments, if there is an error posting the credit and/or debit transaction based on the customer provided financial account information, the credit and/or debit transaction can be resubmitted using different account information. This different account information can be provided by the customer's bank in response to the credit and/or debit transactions. Alternatively, the customer can be notified and requested to provide corrected financial account information (e.g. for the same account, or for a different financial account). In other embodiments, if only the credit, or only the debit transaction is properly received (and confirmed by the customer), the customer's account can be verified for only that type of transaction (e.g. credit or debit).

In some embodiments of the invention, preliminary processing or checking can be performed on the customer provided financial account information to provide preliminary verification. This preliminary processing or checking can be done in real time. Preliminary processing can include checking the provided ABA routing number, which can be compared against a database of known routing numbers. Corrections can be suggested to the customer to select from. The customer's identify can also be checked, for example, using a credit check. Additionally, the entered routing number and bank account number can be checked against a database of fraudulent or previously denied account numbers. Additional guidance, warnings, or instructions can be provided based on any problems detected by the preliminary processing or checking.

A customer can submit the one or more verification codes to an account verification system through the Internet or an IVR system. If the identical one or more codes are provided by the customer, the customer's account can be updated to indicate that it is now verified. If the identical codes are not provided, the customer can be allowed to retry one or more times, with one or more timeouts inserted (e.g. 1 hour). Alternatively, new credit and/or debit transactions can be generated, and the process restarted. As another alternative, a different verification method can be used to verify the customer's provided financial account information.

FIG. 1 shows debit and credit transactions with a random verification code in a statement descriptor of the credit transaction. FIG. 1 shows two example entries 116 and 118 from a customer's financial account statement. The first entry 116 includes a verification code 102, a statement descriptor 104, a transaction amount 106, and a transaction type 114. The second entry includes a statement descriptor 110, a transaction amount 112, and a transaction type 114.

The entries 116 and 118 represent debit and credit transactions to a customer's bank account (e.g. ACH transactions). These entries (including the statement descriptors) are generated from the credit and debits transactions, and are shown on a customer's financial account statement. This statement can be, a paper statement mailed to the customer, an online statement, a listing on a website, a listing provided at an ATM, a electronic downloadable file (e.g. a portable document format file), or an audio listing provided over the phone through an IVR system or customer service representative. Entry 116 includes a statement descriptor 104 that can identify the sending party or verifying entity.

Entry 116 also includes verification code 102. The verification code is added to an entry. A transaction normally includes a statement descriptor 104, transaction amount 106, and transaction type 114, by adding a verification code to a transaction, and correspondingly the account statement entry, the system enables a customer to verify that the corresponding transaction has posted to their account, and that they have access to the account statement. This verification code can be located anywhere within the statement descriptor (e.g. the beginning, the middle, or the end) or comprise the entire statement descriptor. The verification code itself can be a combination of one or more randomly generated alphanumeric symbols. For example, the verification code can be made up of any combination of the letters A-Z and the digits 1-9. In some embodiments, any character capable of being used within the statement descriptor can be used within the verification code. In other embodiments, the verification code can use only a limited set of characters. For example, the verification code can use the numbers one (1) and zero (0), but not the letter "I" or "O", to avoid possible confusion by the customer. As another example, vowels (i.e. A, E, I, O, U) are not used within the verification code to prevent the verification code from randomly spelling a profanity. In some embodiments, the verification code can be 6 characters. This way the verification code is sufficiently long to provide adequate security, but not so long that verification of the code is difficult for the customer. Additionally, sufficient characters are left for the rest of the statement descriptor.

The verification code can also be selected from one or more pre-generated verification codes. These verification codes can be generated ahead of time and then inserted into the statement descriptors. Multiple verification codes can be combined together to form the verification code within the statement descriptor. The verification codes can also be unique and customer specific. A new verification code can be generated for each financial account verification that is unique (e.g. using a central table or counter). This way each customer verifies their account with a verification code that is different than that used to verify any other financial account.

The verification code can be added to either a debit transaction type or a credit transaction type (e.g. a credit of debit ACH transaction). In addition, a single transaction can be used that includes a verification code. A single credit transaction containing a verification code can be used, or a single debit transaction can be used containing a verification code. For example, for an account that needs to be verified as capable of being credited, a single credit transaction with a verification code can be used. As another example, for an account that needs to be verified as capable of being debited, a single debit transaction with a verification code can be used.

For those accounts that need to be verified as capable of being both credited and debited, both a credit and debit transactions can be used. Either, or both, transactions can include a verification code. Depending on the verification rules, the customer would have to verify a specific verification code, either verification code, or both verification codes. Additionally both credit and debit transactions can be used with an account that needs to be verified for only one transaction type (e.g. credit or debit). In this way, offsetting transaction amounts can be used to result in a net zero cost to the sending party.

Entry 116 also includes a transaction amount 106, in this case, one cent. Entry 116 can also include a transaction type, in this case DR, for a debit transaction. This may be indicated in various way on a customer's statement, including a "−" and use of parentheses. There may also be no indication at all if it represents the default transaction type.

Entry 118 represents another transaction to a customer's account. Similar to entry 116, it also includes a statement descriptor 110, a transaction amount 112, and a transaction type 114. In this example, the transaction type is "CR", representing a credit transaction. Similar to the debit transaction type, this may be indicated in various ways on a customer's statement. There may also be no indication at all if it represents the default transaction type.

In embodiments of the invention using a pair of corresponding debit and credit transactions, the transaction amounts 106 and 112 can be used to offset each other. In this way the entity sending the transactions can send the transactions without cost. Instead of sending two credit transactions costing a certain amount of money, corresponding credit and debit transactions can be used to result in no net cost. Alternatively, when using both a credit and debit transaction, the transaction amount of the debit transaction could be any amount less than or equal to the credit transaction. This way the amount of funds in the customer's account is at least as much as it was before the verification process.

When using a pair of corresponding credit and debit transaction, the transactions can be sent at the same time or at different times. For example, the transactions can be sent at the same time in the same ACH transaction batch file. The transactions can also be sent in different batches on different days, but relatively close together, so that the customer can easily check their statement to verify the codes. The credit and debit transactions can also be sent at different times. For example, a credit (or debit) transaction can be sent one month, so that the transaction entry appears on one statement, and the corresponding debit (or credit) transaction can be sent another month, so that the transaction entry appears on another statement. This enhances the security of the system, because a customer is required to access two financial account statements. As described above, depending on the verification rules, and the use of a single verification code or a verification code in each transaction, the customer can be required to verify a specific verification code, either verification code, or both verification codes.

Figure 2:
FIG. 2 shows debit and credit transactions with a verification code in a statement descriptor of both the credit transaction and debit transaction.

FIG. 2 shows debit and credit transactions with a random verification code in a statement descriptor of both the credit transaction and debit transaction. The entry 218 has a statement descriptor 204, a verification code 202, a transaction amount 206, and a transaction type 208. Entry 202 also has a statement descriptor 212, a verification code 210, a transaction amount 214, and a transaction type 216. As described with respect to FIG. 1, these entries represent transactions in the customer's account. Also as described above, by including a verification code in each of a credit and a debit transaction, the security of the system can be increased. The customer can be required to verify a specific verification code (e.g. from the debit or the credit transaction), either verification code (at the customer's choice), or both verification codes.

Figure 3:
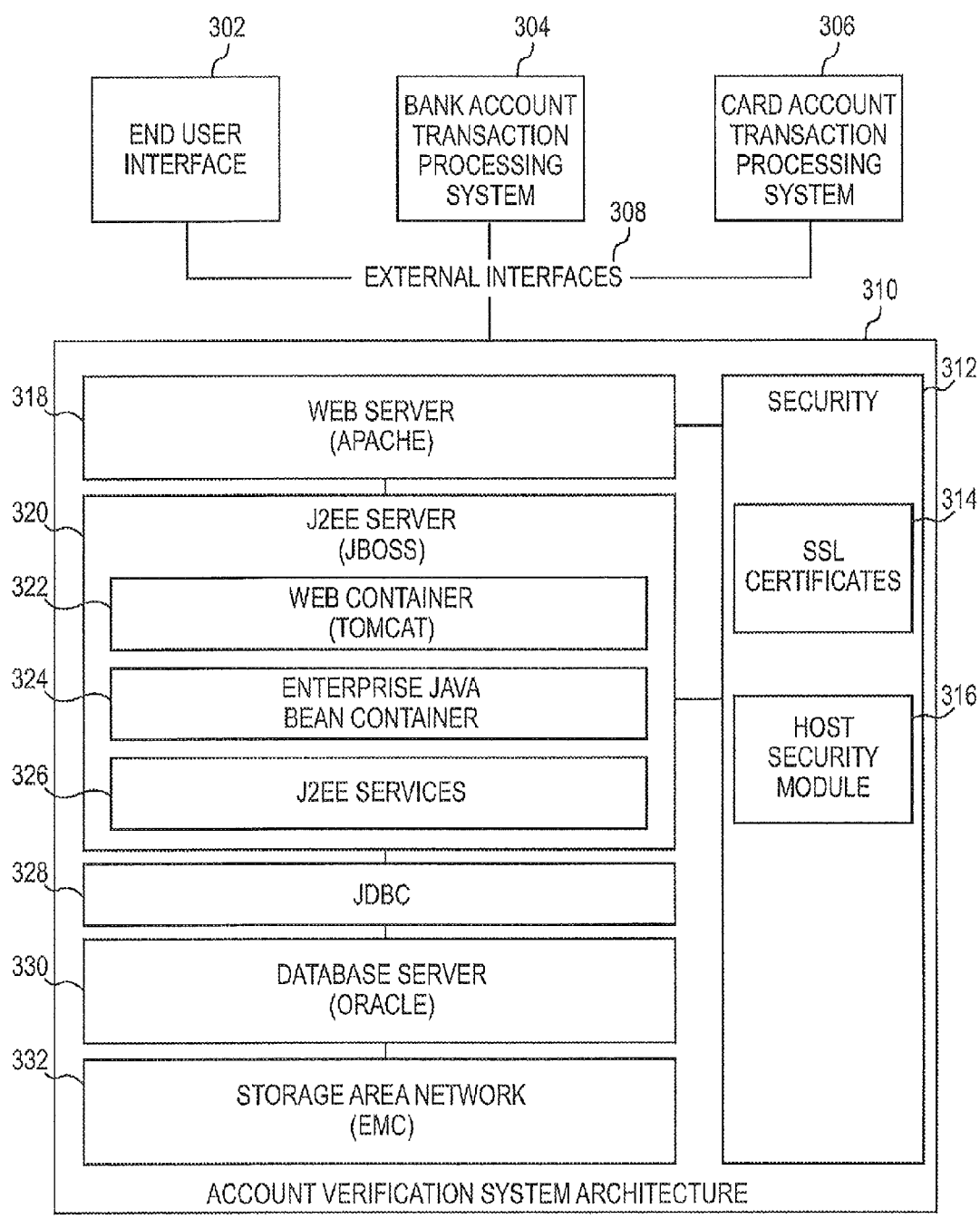
FIG. 3 is a system diagram showing the architecture of the account verification system.

FIG. 3 is a system diagram showing the architecture of the account verification system. The account verification system includes at least one computer server 310 running an application (e.g. a web application) that can be used to interact with end user interface 302 and transaction processing systems 304 and 306. This can be done through any type of electronic communication network 308, such as, the Internet.

End user interface 302 is the customer's interface to the account verification system. In a web based embodiment of the invention, it is a computer running a web browser. The web browser connects to a web application on server 310 that allows the customer to register and/or sign up to access a desired application or financial system. The customer enters their financial account information through this interface, and after receiving the verification codes on the financial account statement, provides the verification codes to the account verification system to verify their access to the financial account. This end user interface could also be an interactive voice response system (IVR), a desktop application, or a mobile application (e.g. on a mobile phone).

Bank account transaction processing system 304 is a known system for processing bank account transactions, such as ACH transfers. It can be used by the application running on server 310 to execute the desired ACH transactions. Similarly, card account transaction processing system 306 can be used by the account verification system to execute the desired credit card account transactions.

Server 310 can be one or more servers executing the account verification system. FIG. 3 shows a web based embodiment of the account version system. It includes a security component 312, a front end 318, back end application processing 320, and storage services 328, 330, and 332.

Web server 318 can be an Apache web server. This can be used as a front end that handles HTTP transactions and presents the HTML generated by back end processing components 320. These components include a J2EE server (e.g. JBOSS) that runs components implementing the account verification system's logic. This logic includes handling the entry of financial account information, the managing of a customer's account, verifying provided verification codes, and notifying customers during the process. The logic can be performed by one or more Java beans executing inside an enterprise java bean container 324. This container could also include presentation components, which in conjunction with web container 322, can be used for the presentation layer of the account verification system. J2EE services can include other back end services used by the account verification system's logic components. These services can include storage services, presentation services, and communication with other systems.

Security component 312 includes SSL certificates 314 and host security module 316. SSL certificates are used by the web server to provide an encrypted connection through network 308 to end user customer 302, or transaction processing systems 304 or 306.

JDBC component 328 is used to provide database connectivity for the account verification system. This includes the components executing within J2EE server 320. Database server 330 stores one or more databases for use by the account verification system. These can include databases of customer financial account information. This information can include account information (debit and/or credit account), profile information (name, address, etc.), verification status (verified or not), transaction history (transaction performed with this account), and links to other accounts. Other databases can include databases of information for the application being accessed by customer, databases of ABA routing numbers, databases of fraudulent customers, and databases of banned customers and account numbers. Databases can be stored on the database server 330 (e.g. Oracle), on a separate server, or on storage area network 332. Storage area network can be any known type of storage area networking system.

Figure 4A:
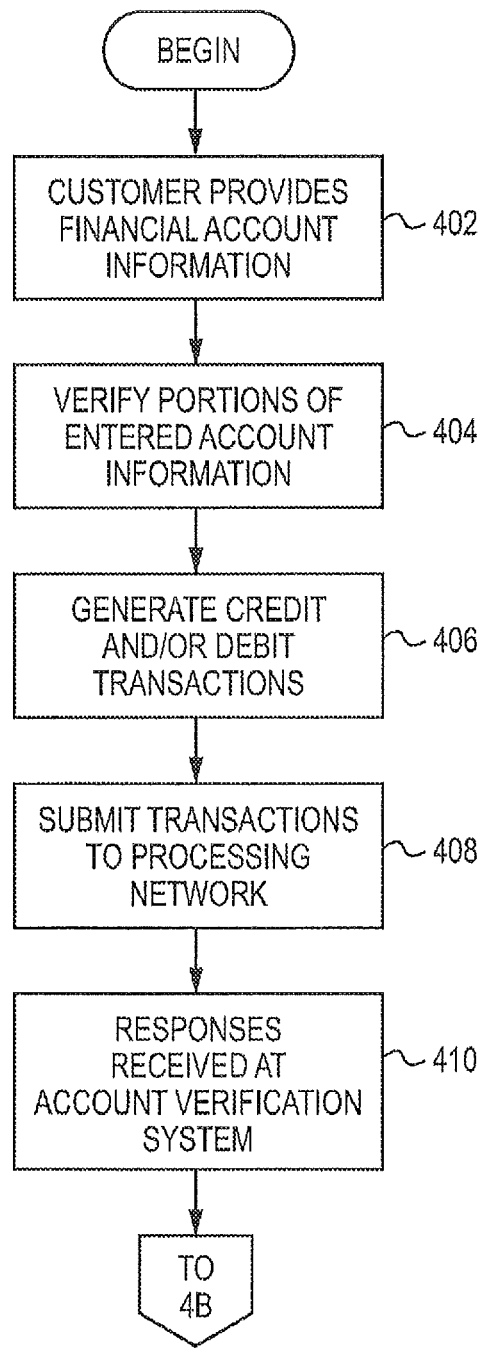
FIG. 4A is a high level flow diagram showing the first part of the account verification process.

FIG. 4A is a high level flow diagram showing the first part of the account verification process. FIG. 4A shows the customer submitting financial account information, the generating of credit and/or debit transactions, and the processing of responses.

At step 402, the customer submits their financial account information, for example, a bank account routing number and account number. This can be provided through customer's end user interface 302. At step 404, the account verification system processes portions of the entered financial account information and checks for certain issues. At step 406, the credit and/or debit transactions with verification codes are generated. As described above, this can be a single credit or debit transaction, or a pair of corresponding credit and debit transaction. Either, or both transactions, can have a verification code in the statement descriptor.

At step 408, the generated transactions are submitted to a processing network for further processing and submission to other banks (e.g. the NACHA processing network). At step 410, responses to the submitted transactions are received and sent back to the account verification system. Based on the responses, new transactions may be submitted, or notifications of success or failure can be sent to the customer (e.g. through the web interface).

Figure 4B:
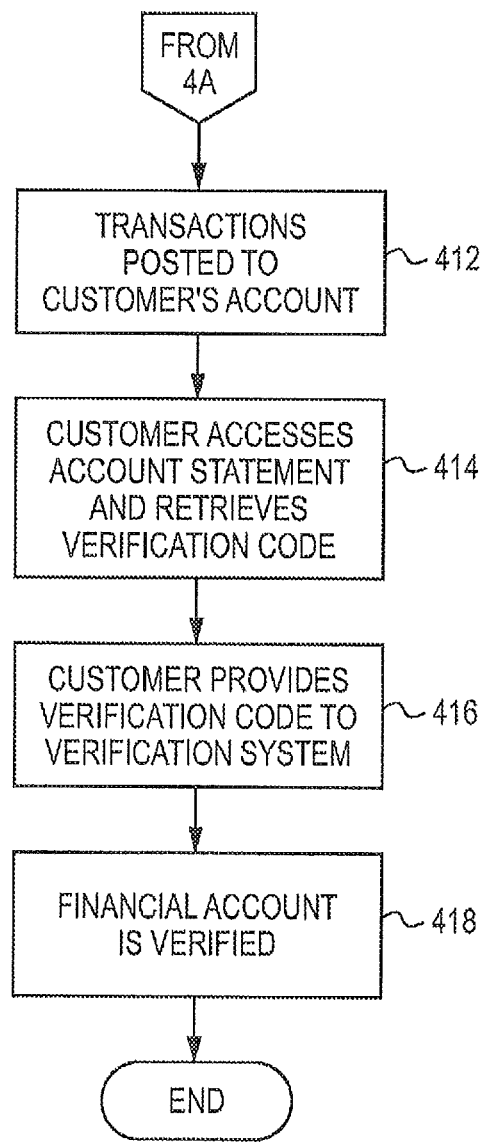
FIG. 4B is a high level flow diagram showing the second part of the account verification process.

FIG. 4B is a high level flow diagram showing the second part of the account verification process. FIG. 4B shows how customers provide the verification codes.

At step 412, the generated debit and/or credit transactions are posted to a customer's account. This results in one or more entries on their financial account statement. At step 414, the user accesses this financial account statement. They can access this through a paper statement received in the mail, an electronic file, or as a listing on an online system. At step 416, the customer submits the one or more verification codes to the account verification system. At step 418, the financial account is verified based on the verification codes provided (e.g. only the credit or the debit, or both the credit and the debit). At this point, the customer can use the application and have it access their financial account (e.g. set up automatic bill payments from the verified account).

Figure 5A:
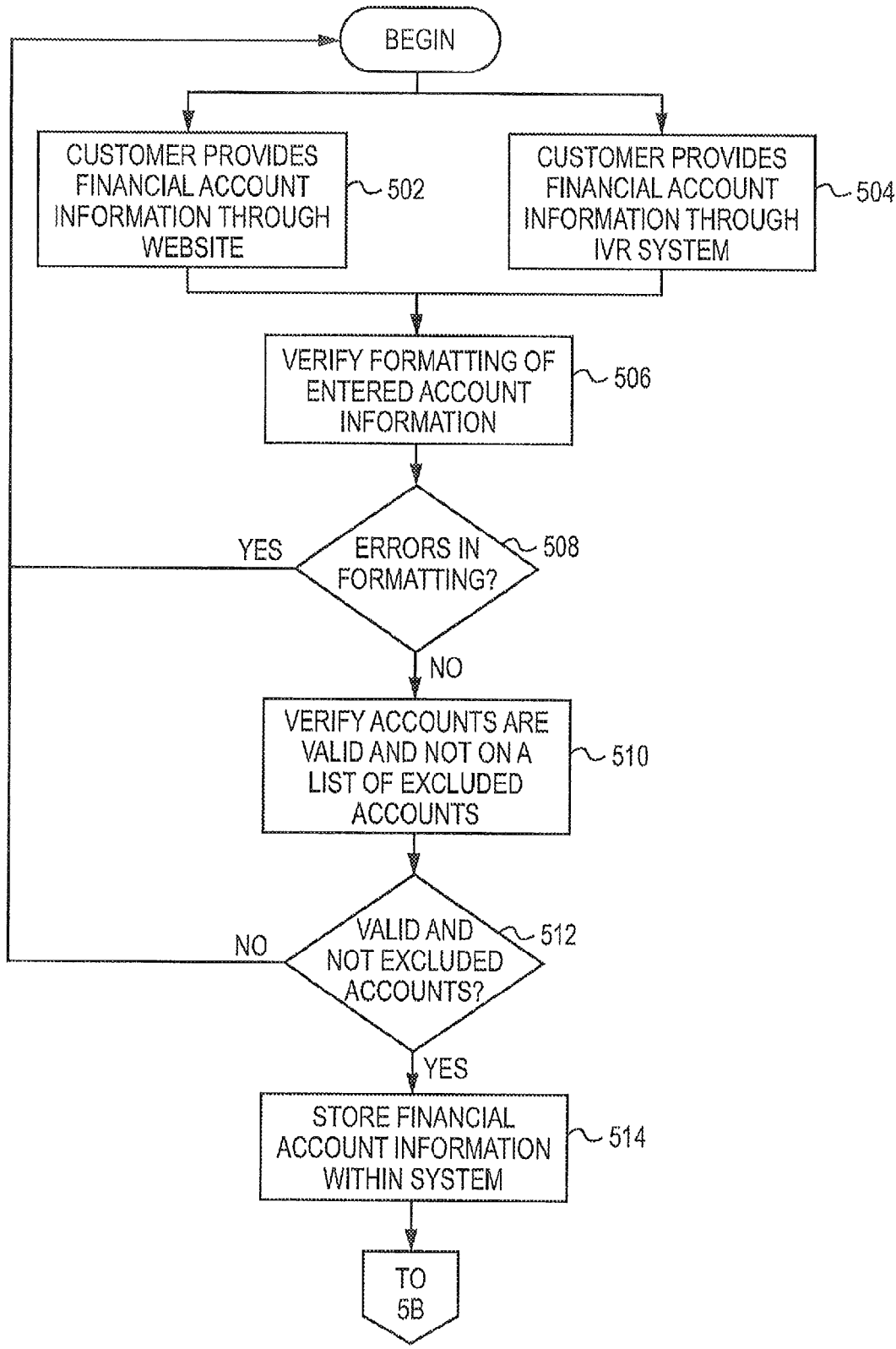
FIG. 5A is a detailed flow diagram showing the first part of the account verification process.

FIG. 5A is a detailed flow diagram showing the first part of the account verification process. FIG. 5A shows details of receiving and processing the customer provided financial account information.

At step 502, the customer provides their financial account information through a website, for example, by filling out a form. This financial account information can include the name and owner of the account, the ABA routing number of a bank, the account number, and whether the account is for debits, credits, or debits and credits. Alternatively, at step 504, this same information could be provided through an interactive voice response system. For credit card accounts, the financial account information can include the name of the account, the card number, the expiration date, and the card security code (i.e. the three or four digit code on the credit card itself).

At step 506, the logic of the account verification system (e.g. as contained within J2EE server 320 of FIG. 3) can verify the formatting and accuracy of the information. For example, the customer may have entered too few digits for an ABA routing number. As another example, the customer may have entered too many digits for a credit card account number. The entered information can be compared against different formats depending on the country the financial account is located in. At this step, notifications or warnings can be provided to the customer, assisting them in re-entering the information. Examples can also be provided to help the customer correct their error. Similarly, when financial account information is being entered through an IVR system, notifications or warnings can be provided to the customer over the phone. These checks can be done in real time, which includes, as the user is entering their financial account information, or immediately after the information has been submitted. At step 508, if there are any errors, the customer is given a chance to correct the errors.

At step 510, the entered account information is processed and checked using one or more databases or verification services to determine if there are any issues with the entered information. This may include checking the validity of the ABA routing number, whether the ABA accepts electronic debits, whether an override ABA needs to be used, performing DDA negative file checks, and checking for prior returned DDA payments. In addition, a credit check may be done to determine if the customer has declared bankruptcy or is delinquent on their account. As another example, for a bank account, the account number can be checked against a database to determine if the account is delinquent. As another example, the customer's name and/or account number can be checked again a database of fraudulent accounts, or other accounts that are otherwise excluded from being used. Similar to the formatting checks at step 506, this processing and the corresponding checks can be done in real time, so that the customer can be immediately notified and given the opportunity to enter alternative financial account information, or to correct their financial account information.

At step 514, the entered financial account information, and other information is stored within the account verification system, for example, in a database of customer information within database system 330. The information stored can also indicate that the financial account information is not yet verified.

Figure 5B:
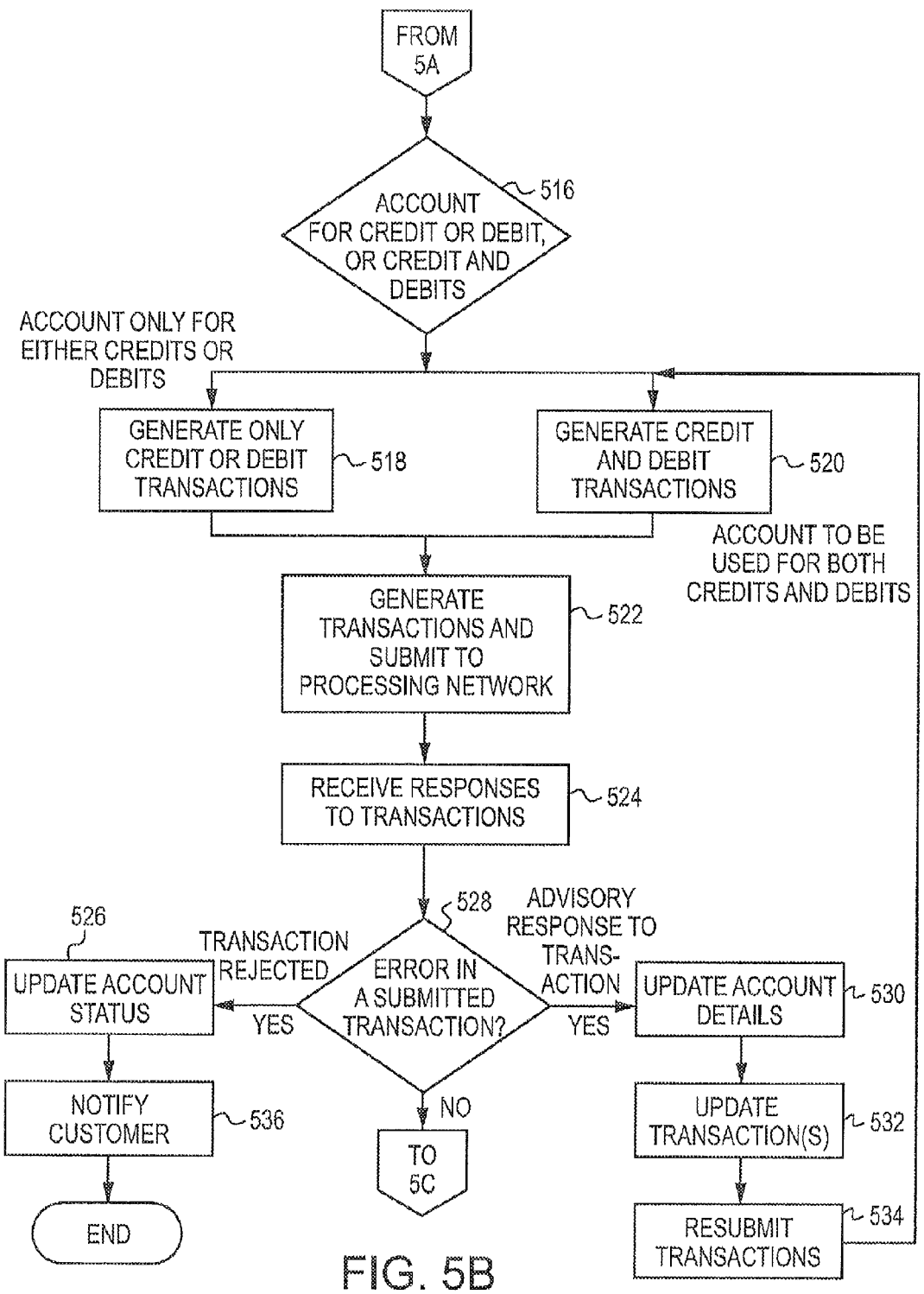
FIG. 5B is a detailed flow diagram showing the second part of the account verification process.

FIG. 5B is a detailed flow diagram showing the second part of the account verification process. FIG. 5B shows further details of generating transactions, submitting transactions, and processing responses to the credit and/or debit transactions.

At step 516, the account verification system determines whether the financial account is to be used for credits, debits, or credits and debits. This information may have been provided by the customer, or a choice can be made based on the type of financial account provided. At step 518, if the account is for credit or debit, the corresponding type of transaction and statement descriptor with a verification code is generated. At step 520 if the account is to be used for both credits and debits, both types of transactions are generated. Alternatively, as described above, even an account for only one type of transaction can be sent both a credit and a debit transaction, for example, for achieving zero net cost to the account verification system. A verification code can be added to both the debit and the credit transaction.

At step 522, the transactions are generated, and in the situation of verifying a bank account, ACH transactions are generated. The ACH transactions each have a statement descriptor, which can be filled in with a standard entity name. The statement descriptor also includes the verification code, which as described above, can be randomly generated, or selected from pre-generated verification codes.

The ACH transactions can be grouped into a single file for batch submission to the ACH processing network. Alternatively, the transactions can be separated and submitted at different times. The transactions, or the batch file, depending on the architecture of the system, can be submitted to the appropriate transaction processing system 304 or 306. These transaction processing systems can then submit the transactions to the processing network to be posted to customer's financial accounts.

The transaction processing systems can perform their own checks of the generated transactions before submitting to a processing network. These checks can be the same as those above at step 510. Because the transactions are submitted after they are generated (e.g. up to a day later for one daily submissions), repeating the checks can detect any changes.

At step 524, after the transactions have been processed, responses are received, for example, by transaction processing systems 304 and 306. At step 528, if the responses indicate an error, then steps are taken to correct the error and resubmit the transactions. Otherwise, the process continues to step 538, and the customer can access their account to retrieve the verification code and verify their ownership of the accounts.

At step 526, if a transaction was rejected, then the customer's account is updated to indicate invalid financial account information. At step 536, the customer is notified of the failure. They may then be informed of alternative account verification methods, or an alternative method may automatically be started for them. A transaction may be rejected because the account has been closed, the financial entity receiving the transaction cannot find the account, the account number is invalid, the customer access is not authorized, transactions are not allowed with the account, or insufficient funds.

At step 530, if there is an advisory response to a submitted transaction, for example, a credit transaction, then the customer financial account information details are updated based on the response. For example, the response can include updated or corrected account information. At step 532, the credit and/or debit transactions are updated (or regenerated). At step 534, the updated transactions are resubmitted with the updated financial account information. The same, or new verification codes can be used within the statement descriptors.

In some cases, advisory notices can be generated manually by the responding financial entity. These returns may in some cases not automatically match up with the generated transactions. In these cases, the unmatched returns can be added to a work queue for manual processing by someone managing the account verification system.

Figure 5C:
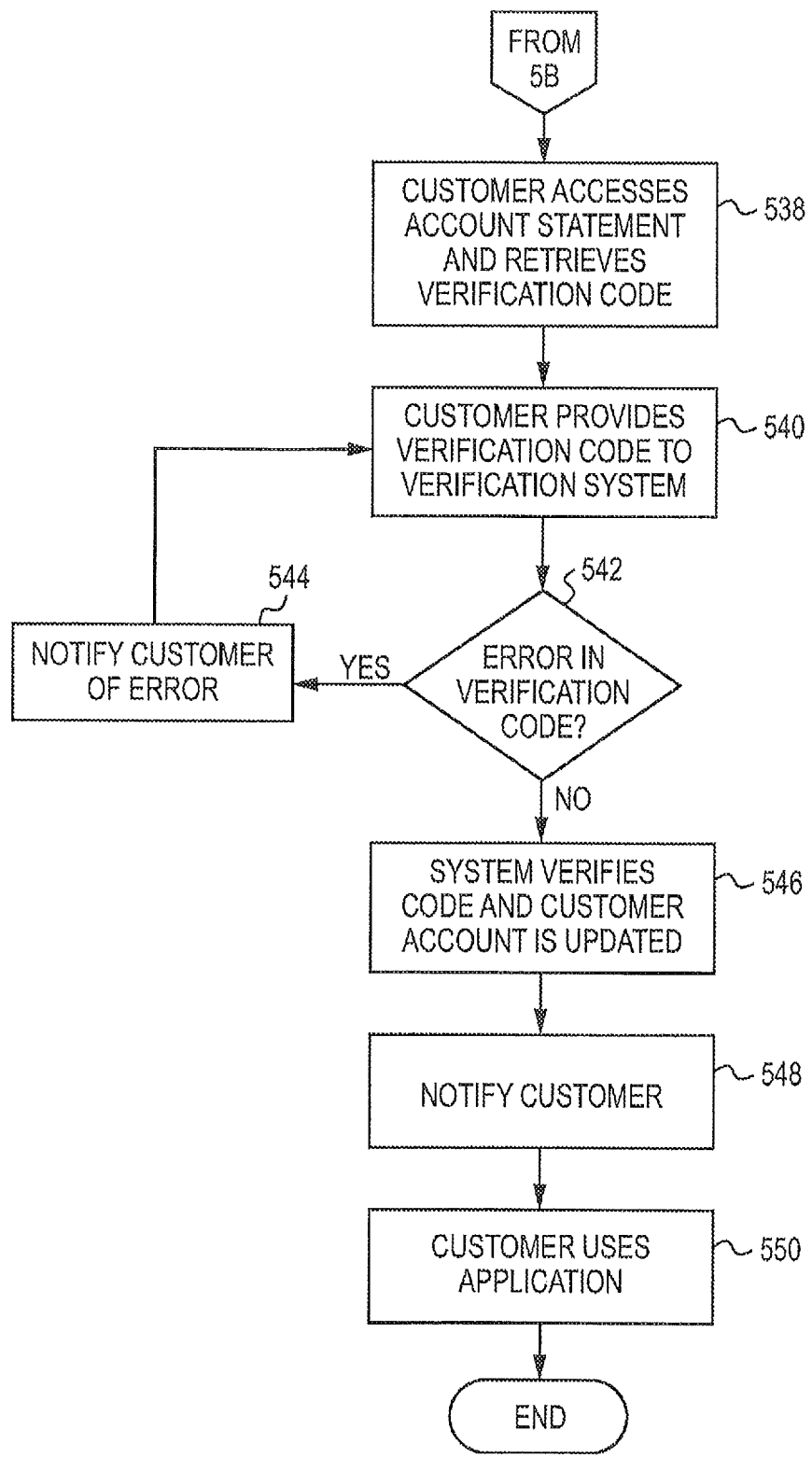
FIG. 5C is a detailed flow diagram showing the third part of the account verification process.

FIG. 5C is a detailed flow diagram showing the third part of the account verification process. FIG. 5C shows details of a customer providing the received verification codes.

At step 538, the customer accesses their account statement, which as described above, can be in a variety of formats. At step 540, the user finds the correct entries and verification codes, and enters them into the account verification system using their end user interface. At step 542, if there is an error in a submitted code, the customer is notified at step 544. The customer can then be allowed to resubmit the code. Additionally, one or more errors or warnings can be provided to the customer to assist the customer in entering the right code (e.g. a warning about caps lock). Further, the user can be given a certain number of chances, for example, three chances, before the verification process is restarted and new verification codes are sent. Alternatively, the account verification system can request new financial account information to be verified. In which case, the current financial account information can be added to an excluded list. Timeouts can also be used in between failed verification attempts to make randomly guessing the one or more verification codes more difficult.

In some embodiments, when multiple verification codes are being submitted, the error and retry process can be done with respect to one verification code, or both. For example, if the verification code in the credit transaction, but not the debit transaction, was entered correctly, the account can be activated for just credit transactions. As another example, the correctly entered code can be accepted, while the user is given more chances or warnings with respect to the incorrectly entered code. Alternatively, only a new transaction and a new verification code is sent for the type of transaction that could not be confirmed. In other embodiments, the verification codes are treated as a pair and not accepted unless both are entered correctly.

At step 546, when there are no errors in the submitted verification codes, the account verification system verifies the codes and the customer's financial account information. The customer's account is updated to reflect that the financial account information has been verified. At step 548, the customer is notified their codes have been accepted. At step 550, the customer is able to use the application or financial system for which their financial information was required. For example, this could be a bill payment system, a new saving account, or an automatic debit for a monthly insurance payment.

Encryption and other enhanced security measures can be used at multiple points in the account verification process. The customer end user interface can connect to the account verification system using a secure network. Alternatively, the user can connect to the account verification system using an encrypted communication protocol, for example, in a web based embodiment of the invention, a secure socket layer (SSL) connection. The customer's financial account information can also be stored in an encrypted format in the databases. Therefore, even someone able to get access to the database would not be able to access the account information. The generated transactions can be stored in an encrypted file and communicated to the transaction processing systems using an encrypted communication protocol. The generated batch files can also be encrypted before submission to the NACHA processing network.

Figure 6:
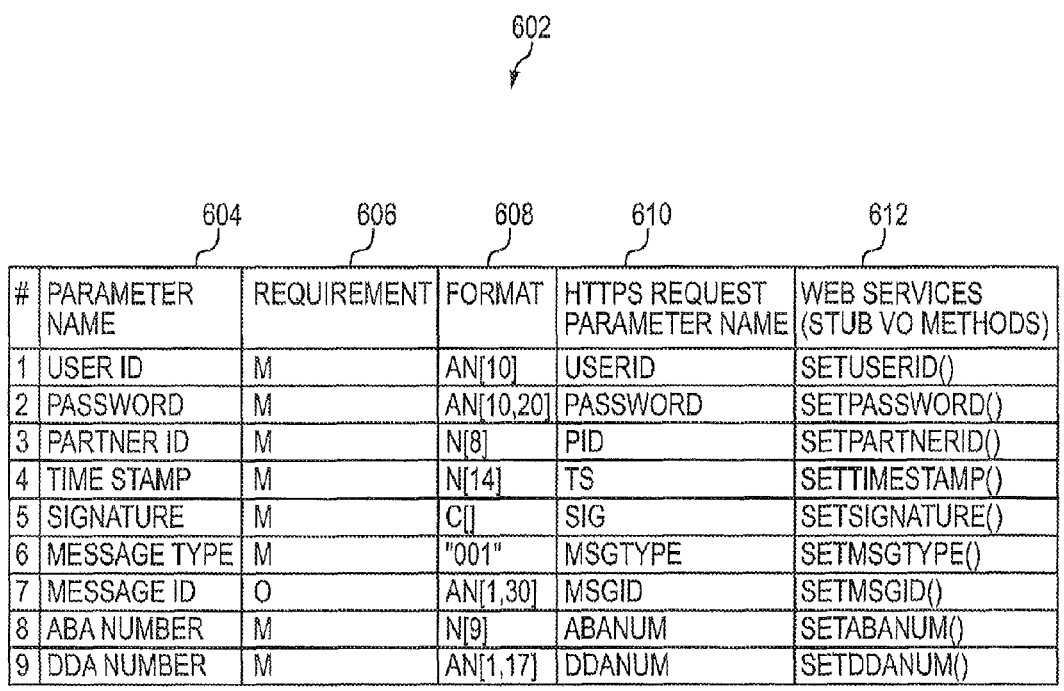
FIG. 6 shows details of validating customer provided financial information in real time.

FIG. 6 shows details of validating customer provided financial account information in real time. FIG. 6 describes the interface to a component that can process the information, for example, by checking one or more databases (e.g. a Thompson database) and or other services (e.g. credit check). This component can be a component of account verification system and executing on server 310, or it can be a component of transaction processing systems 304 or 306. The interface has a number of parameters 604. These may be required or optional, as indicate by field 606. Field 608 describes the format for each of the parameters. Field 610 provides the corresponding HTTPS request parameter name. In a web based embodiment of the invention, these would be the form values entered by the user, or generated by the web application. Field 612 shows the corresponding function call for the interface to pass these parameters to the account verification system. The parameters that can be used for generating a validation request include, the user ID, the password, the pay liter ID, the time stamp, the signature, the message type, the message ID, the ABA number, and the DDA number.

Figure 7:
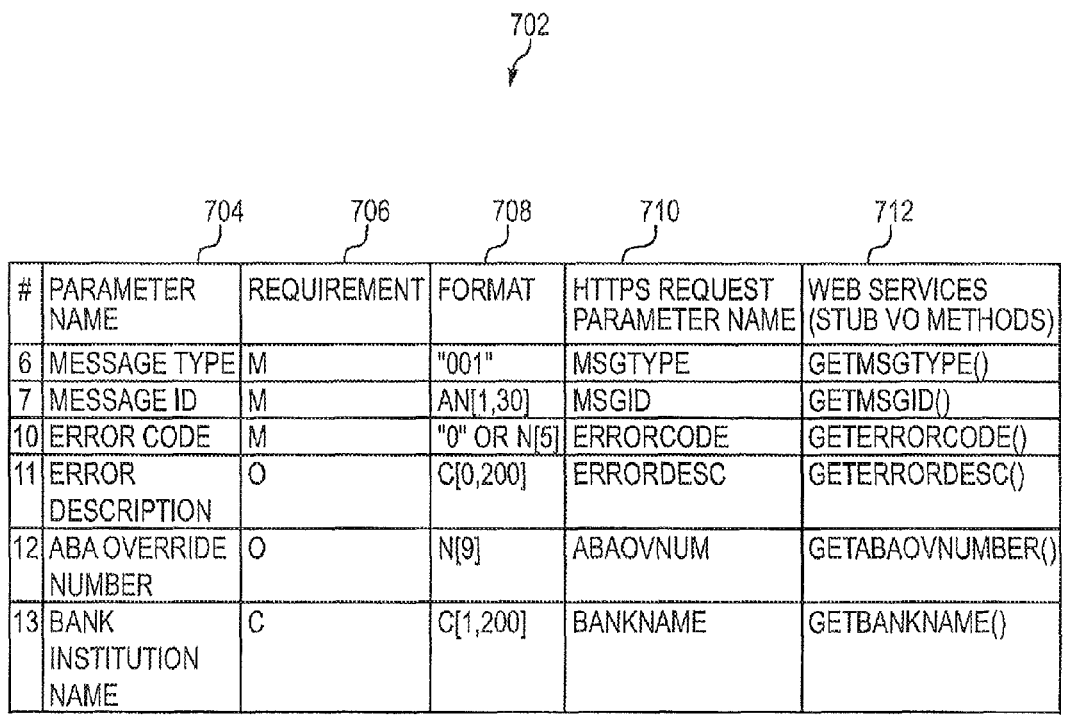
FIG. 7 shows details of responses to a validation request.

FIG. 7 shows details of responses to a validation request. The responses can be broken down into various parameters 704. The various parameters may or may not be present as indicated by field 706. Field 708 describes the format of the responses. Field 710 provides the corresponding parameter names within a web based embodiment of the invention. Field 712 shows the corresponding function call for the interface for each of the parameters. The parameters include the message type, the message ID, the error code, the error description, the ABA override number, and the bank institution number.

Although embodiments of the invention have been described mainly within the context of verifying bank account information, embodiments of the invention can be used with any type of financial account with which transactions can be performed, and which provides transactions with statement descriptors. Examples of such financial accounts include, bank accounts (e.g. savings, checking, money market), credit card accounts, brokerage accounts, retirement accounts, debit card accounts, prepaid accounts (e.g. phone, transportation), and mileage or reward accounts.

Although embodiment of the invention have been described in the context of a single credit or debit transaction, or a pair of corresponding debit and credit transactions, embodiments of the invention also include using more than two transaction (e.g. more than a pair of credit and debit transactions). Embodiments of the invention could be used with two pairs of transactions (two credits and two debits) or three transactions (e.g. two credits and one debit). In each case, the transaction amounts could still be used to result in a net zero cost to the verifying party. Verification codes could be added to all, or less than all, of the transactions.

Other embodiments, extensions and modifications of the ideas presented above are comprehended and within the reach of one versed in the art upon reviewing the present disclosure. Accordingly, the scope of the present invention in its various aspects should not be limited by the examples and embodiments presented above. The individual aspects of the present invention and the entirety of the invention should be regarded so as to allow for such design modifications and future developments within the scope of the present disclosure. The present invention is limited only by the claims that follow.

The invention claimed is:

1. A computer implemented method executed by an account verification computer system for managing customer access to a financial application, comprising:
   (a) electronically receiving, by a web computer server executed by the account verification computer system using at least one of a secure network and an encrypted communication protocol, customer supplied financial account information provided through an end user interface comprising at least one of a customer computer executing a web browser connected to a web application on the web computer server, an interactive voice response system (IVR), a desktop application on the customer computer, and a mobile application on a customer mobile device;
   (b) electronically processing, by a processing computer server executed by the account verification computer system, the customer supplied financial account information, verifying formatting of the customer supplied financial account information and verifying that the customer financial account is valid and not on a predetermined list of excluded accounts;
   (c) electronically randomly generating, by the processing computer server executed by the account verification computer system, a first verification code that is unique at least for each customer financial account;

(d) electronically adding the first verification code to a first statement descriptor of at least one of an electronic debit transaction and an electronic credit transaction;

(e) electronically transmitting the at least one of the electronic debit transaction and the electronic credit transaction including the first verification code and the first statement descriptor to the customer financial account, based on the customer supplied financial account information;

(f) electronically receiving, by the web computer server executed by the account verification computer system using the at least one of the secure network and the encrypted communication protocol, from the customer, via the end user interface, a second verification code responsive to the first verification code;

(g) comparing, by the processing computer server executed by the account verification computer system, the first verification code and the second verification code with respect to each other;

(h) verifying, by the processing computer server executed by the account verification computer system, the customer supplied financial account information responsive to said comparing; and (i) providing, by the processing computer server executed by the account verification computer system, to the customer, electronic access to use the financial application for the customer financial account responsive to said verifying.

2. The method of claim 1, wherein the at least one of the electronic debit transaction and the electronic credit transaction is an ACH transaction.

3. The method of claim 1, further comprising electronically receiving the second verification code through a website displayed by the web browser of the customer computer accessing the web application on the web server computer.

4. The method of claim 1, further comprising, when the at least one of the electronic debit transaction and the electronic credit transaction is electronically transmitted in a first transaction representing a first amount to be one of debited from the customer financial account and credited to the customer financial account, a second transaction is also electronically transmitted to the customer financial account for a second amount representing one of a debit from the customer financial account and a credit to the customer financial account that offsets the first amount.

5. The method of claim 1, wherein, when an electronic credit transaction is electronically transmitted, said electronically transmitting the electronic credit transaction further comprises transmitting the electronic credit transaction in a batch request.

6. The method of claim 5, wherein, when an electronic debit transaction is electronically transmitted, said electronically transmitting the electronic debit transaction further comprises transmitting the electronic debit transaction in a batch request together with at least one electronic credit transaction.

7. The method of claim 1, further comprising at least one of:
receiving a failed transaction notification in response to a failed transaction, wherein the notification comprises a request for correct financial account information, updating the customer's account to indicate invalid financial account information, and notifying the customer of the failure; and receiving an advisory response to a submitted transaction, wherein the advisory response comprises corrected financial account information, updating the submitted transaction, and resubmitting the updated transaction with at least one of the original verification code and a new verification code, using the corrected financial account information.

8. The method of claim 1, wherein the customer supplied financial account information includes a bank routing number; and wherein the bank routing number is verified in real time when it is received from the customer.

9. The method of claim 1, further comprising using an alternative verification method to verify the customer supplied financial account information responsive to the comparison of the first verification code not being identical to the second verification code.

10. The method of claim 1, wherein the at least one of the electronic debit transaction and the electronic credit transaction is a credit card transaction.

11. The method of claim 1, further comprising at least one of:
checking, in real-time, a routing number of the customer supplied financial account information using a database to ensure it is a valid routing number; and
checking, in real-time, an account number of the customer supplied financial account information using a database of excluded account numbers.

12. The method of claim 1, further comprising:
electronically randomly generating, by the processing computer server executed by the account verification computer system, a third verification code that is unique at least for each customer financial account;
electronically adding the third verification code to at least one of an electronic debit transaction and an electronic credit transaction;
electronically transmitting, by the processing computer server executed by the account verification computer system, the at least one of the electronic debit transaction and the electronic credit transaction including the third verification code to the customer financial account, based on the customer supplied financial account information;
electronically receiving, by the web computer server executed by the account verification computer system using at least one of a secure network and an encrypted communication protocol, from the customer, via the end user interface, a fourth verification code responsive to the third verification code;
comparing, by the processing computer server executed by the account verification computer system, the third verification code and the fourth verification code with respect to each other; and
verifying, by the processing computer server executed by the account verification computer system, the customer supplied financial account information responsive to said comparing the third verification code and the fourth verification code.

13. The method of claim 12, further comprising transmitting the first verification code in the first statement descriptor for display on a first financial account statement, and transmitting the third verification code in a second statement descriptor for display on the first financial account statement or a second financial account statement.

14. The method of claim 1, further comprising:
electronically providing, by the account verification computer system, a customer financial account statement to the customer, wherein the customer financial account statement is at least one of an online statement, a listing on a website, a listing provided at an ATM, and an electronic downloadable file.

15. The method of claim 1, further comprising:
electronically providing, by the account verification computer system, to the customer a statement of the customer financial account, the statement including an entry corresponding to the at least one of the electronic debit transaction and the electronic credit transaction, and the entry including the first verification code.

16. The method of claim 1, further comprising:
storing in at least one database, by at least one database computer server or storage area network system to be accessed by the account verification computer system, the customer financial account information including at least one of account information, profile information, verification status, transaction history, and electronic links to other accounts.

17. The method of claim 1, further comprising:
electronically receiving, by the web computer server executed by the account verification computer system, HTML data including the customer supplied financial account information provided through the end user interface, and decrypting the HTML data using a security component including at least one secure socket layer (SSL) certificate before checking contents of the customer supplied financial information.

18. The method of claim 1, further comprising at least one of: updating the customer financial account to reflect that the customer supplied financial account information has been verified; notifying the customer that the customer supplied financial account information has been verified; and providing the customer access to an application or system for which the customer supplied financial account information was required.

19. The method of claim 1, wherein said processing the customer supplied financial account information comprises generating a validation request including at least one of a user ID, a password, a partner ID, a time stamp, a signature, a message type, a message ID, an electronic routing number, and an account number.

20. The method of claim 1, wherein said processing the customer supplied financial account information further comprises: generating the at least one of the electronic debit transaction and the electronic credit transaction including the first verification code; submitting the generated transaction to a processing network; receiving a response to the submitted transaction from the processing network; and posting the at least one of the electronic debit transaction and the electronic credit transaction to the customer financial account when there is no error indicated in the submitted transaction.

21. An account verification computer system architecture for managing customer access to a financial application, comprising:
at least one computer server executed by the account verification computer system, and at least one database connected thereto, said at least one database including one or more databases storing customer supplied financial account information, and said at least one computer server comprising:
a web computer server handling HTTP transactions and presenting HTML content, said web computer server interacting with at least one of an end user interface, a bank account transaction processing computer system, and a card account transaction processing computer system, said end user interface comprising at least one of a customer computer executing a web browser connected to a web application on the web computer server, an interactive voice response system (IVR), a desktop application on the customer computer, and a mobile application on a customer mobile device;
a processing computer server executing a plurality of processing components of the account verification computer system, including handling entry of the customer supplied financial account information, managing of a customer's account, verifying customer-provided verification codes, and providing customer notifications;
a security component connected to the web computer server and the processing computer server, comprising one or more secure socket layer (SSL) certificates and an account verification system security module; and
a database computer server accessing the one or more databases storing the customer supplied financial account information for use by the account verification system, said web computer server electronically receiving the customer supplied financial account information provided through the end user interface;
said processing computer server electronically processing the customer supplied financial account information, verifying formatting of the customer supplied financial account information and verifying that the customer financial account is valid and not on a predetermined list of excluded accounts; electronically randomly generating a first verification code that is unique at least for each customer financial account; electronically adding the first verification code to a statement descriptor of at least one of an electronic debit transaction and an electronic credit transaction; and electronically transmitting the at least one of the electronic debit transaction and the electronic credit transaction including the first verification code and the statement descriptor to the customer financial account, based on the customer supplied financial account information;
said web computer server electronically receiving, from the customer, via the end user interface, a second verification code responsive to the first verification code; and
said processing computer server comparing the first verification code and the second verification code with respect to each other, verifying the customer supplied financial account information responsive to said comparing, and providing the customer electronic access to use the financial application for the customer financial account responsive to said verifying.

22. The account verification computer system architecture of claim 21, wherein the at least one of the electronic debit transaction and the electronic credit transaction is an ACH transaction.

23. The account verification computer system architecture of claim 21, wherein, when the at least one of the electronic debit transaction and the electronic credit transaction is electronically transmitted in a first transaction representing a first amount to be one of debited from the customer financial account and credited to the customer financial account, a second transaction is also electronically transmitted to the customer financial account for a second amount representing one of a debit from the customer financial account and a credit to the customer financial account that offsets the first amount.

24. The account verification computer system architecture of claim 21, wherein said processing computer server is configured to perform at least one of:
   receiving a failed transaction notification in response to a failed transaction, wherein the notification comprises a request for correct financial account information, updating the customer's account to indicate invalid financial account information, and notifying the customer of the failure; and
   receiving an advisory response to a submitted transaction, wherein the advisory response comprises corrected financial account information, updating the submitted transaction, and resubmitting the updated transaction with at least one of the original verification code and a new verification code, using the corrected financial account information.

25. The account verification computer system architecture of claim 21, wherein said processing computer server is configured to perform at least one of:
   checking, in real-time, a routing number of the customer supplied financial account information using a database to ensure it is a valid routing number; and
   checking, in real-time, an account number of the customer supplied financial account information using a database of excluded account numbers.

26. The account verification computer system architecture of claim 21, further comprising:
   said processing computer server electronically randomly generating a third verification code that is unique at least for each customer financial account; electronically adding the third verification code to at least one of an electronic debit transaction and an electronic credit transaction, and electronically transmitting the at least one of the electronic debit transaction and the electronic credit transaction including the third verification code to the customer financial account, based on the customer supplied financial account information;
   said web computer server electronically receiving, from the customer, via the end user interface, a fourth verification code responsive to the third verification code; and
   said processing computer server comparing the third verification code and the fourth verification code with respect to each other, and verifying the customer supplied financial account information responsive to said comparing the third verification code and the fourth verification code.

27. The account verification computer system architecture of claim 21, further comprising:
   the account verification computer system electronically providing to the customer a statement of the customer financial account, the statement including an entry corresponding to the at least one of the electronic debit transaction and the electronic credit transaction, and the entry including the first verification code.

28. The account verification computer system architecture of claim 21, wherein said at least one database comprises at least one of a database of information for an application being accessed by the customer, a database of electronic routing numbers, a database of fraudulent customers, and a database of banned customers and account numbers.

29. The account verification computer system architecture of claim 21, further comprising:
   the web computer server executed by the account verification computer system electronically receiving HTML data including the customer supplied financial account information provided through the end user interface, and decrypting the HTML data before checking contents of the customer supplied financial information.

30. The account verification computer system architecture of claim 21, wherein said processing computer server executes components performed by one or more Java beans executing inside an enterprise Java bean container.

31. The account verification computer system architecture of claim 30, wherein the enterprise Java bean container includes presentation components which in conjunction with a web container form a presentation layer of the account verification computer system.

32. The account verification computer system architecture of claim 21, wherein said processing computer server includes services comprising at least one of storage services, presentation services, and communication with other computer systems.

33. The account verification computer system architecture of claim 21, wherein the security component comprises one or more secure socket layer (SSL) certificates used by the web computer server to provide an encrypted connection to the at least one of the end user interface, the bank account transaction processing computer system, and the card account transaction processing computer system.

34. The account verification computer system architecture of claim 21, further comprising a JDBC component in communication with the web computer server and the database computer server, providing database connectivity for the account verification computer system.

35. An account verification computer system architecture for managing customer access to a financial application, comprising:
   at least one computer server executed by the account verification computer system, and at least one database connected thereto, said at least one database including one or more databases storing the customer supplied financial account information, and said at least one computer server comprising:
      a web computer server handling HTTP transactions and presenting HTML content, said web computer server interacting with at least one of an end user interface, a bank account transaction processing computer system, and a card account transaction processing computer system, said end user interface comprising at least one of a customer computer executing a web browser connected to a web application on the web computer server, an interactive voice response system (IVR), a desktop application on the customer computer, and a mobile application on a customer mobile device;
      a processing computer server means for executing a plurality of processing components of the account verification computer system, including handling entry of the customer supplied financial account information, managing of a customer's account, verifying customer-provided verification codes, and providing customer notifications;
      a security component connected to the web computer server and the processing computer server, comprising one or more secure socket layer (SSL) certificates and an account verification system security module; and a database computer server accessing the one or more databases storing the customer supplied financial account information for use by the account verification system, said web computer server electronically receiving the customer supplied financial account information provided through the end user interface;

said processing computer server means electronically processing the customer supplied financial account information, verifying formatting of the customer supplied financial account information and verifying that the customer financial account is valid and not on a predetermined list of excluded accounts; electronically randomly generating a first verification code that is unique at least for each customer financial account; electronically adding the first verification code to a statement descriptor at least one of an electronic debit transaction and an electronic credit transaction; and electronically transmitting the at least one of the electronic debit transaction and the electronic credit transaction including the first verification code and the statement descriptor to the customer financial account, based on the customer supplied financial account information;

said web computer server electronically receiving, from the customer, via the end user interface, a second verification code responsive to the first verification code; and said processing computer server means comparing the first verification code and the second verification code with respect to each other, verifying the customer supplied financial account information responsive to said comparing, and providing the customer electronic access to use the financial application for the customer financial account responsive to said verifying.

* * * * *